US006931186B2

(12) United States Patent
Sillard et al.

(10) Patent No.: US 6,931,186 B2
(45) Date of Patent: Aug. 16, 2005

(54) CHROMATIC DISPERSION COMPENSATION MODULE

(75) Inventors: Pierre Sillard, Le Chesnay (FR); Bruno Dany, Maisons-Laffitte (FR); Alain Bertaina, Paris (FR); Maxime Gorlier, Paris (FR)

(73) Assignee: Alcatel, Paris (FR)

( * ) Notice: Subject to any disclaimer, the term of this patent is extended or adjusted under 35 U.S.C. 154(b) by 120 days.

(21) Appl. No.: 10/668,271

(22) Filed: Sep. 24, 2003

(65) Prior Publication Data

US 2004/0105638 A1 Jun. 3, 2004

Related U.S. Application Data

(63) Continuation-in-part of application No. 10/289,439, filed on Nov. 7, 2002.

(30) Foreign Application Priority Data

Apr. 5, 2002 (FR) ............................................ 02 04271
Apr. 29, 2003 (FR) ............................................ 03 05224

(51) Int. Cl.$^7$ ................................................. G02B 6/02
(52) U.S. Cl. ........................ 385/123; 385/124; 385/26; 385/27; 385/147; 385/28
(58) Field of Search ............................... 385/123, 124, 385/26, 27, 28, 147

(56) References Cited

U.S. PATENT DOCUMENTS

| 5,261,016 A | 11/1993 | Poole |
| 5,802,234 A | 9/1998 | Vengsarkar et al. |
| 2002/0003646 A1 | 1/2002 | Ishikawa |
| 2002/0012510 A1 | 1/2002 | Jiang |
| 2002/0118934 A1 | 8/2002 | Danziger |
| 2003/0026533 A1 | 2/2003 | Danziger |

FOREIGN PATENT DOCUMENTS

| EP | 0 971 493 A | 1/2000 |
| EP | 1 076 250 A | 2/2001 |
| WO | WO 03/050577 A | 6/2003 |

OTHER PUBLICATIONS

A. Goel et al, "Wide–Ban Dispersion Compensating Optical Fiber", IEEE Photonics Technology Letters, IEEE Inc., New York, US, vol., 8, No. 1, Dec. 1, 1996 pp. 1668–1670, XP000679544.
A. H. Gnauck et al, "Dispersion and dispersion–slope compensation of NZDSF over the entire C band using higher-order mode fibre", Electronics Letters, IEEE Stevenage, GB, vol. 36,, No. 23, Nov. 9, 2000, pp. 1946–1947, XP006015890.
M. Eguchi et al, Dispersion Compensation Based onDual–Mode Optical Fibre with Inhomogeneous Profile Core, Journal of Lightwave Technology, IEEE, New York, US, vol. 14, No. 10 Oct. 1, 1996, pp. 2387–2394, XP000631544.
A. Goel et al, "Wide–Band Dispersion Compensating Optical Fiber", IEEE Photonics Technology Letters, IEEE, Inc, NY, vol. 8, No. 12, Dec. 1, 1996, pp. 1668–1670, XP000679544.
A. H. Gnauck et al, "Dispersion and dispresion–slope compensation of NZDSF over the entire C band using higher-order–mode fibre", Electronics Letters, IEE Stevenage, GB, vol. 36, No. 23, Nov. 9, 2000, pp. 1946–1947, XP006015890.
M. Eguchi et al, "Dispersion Compensation Based on Dual–Mode Optical Fibre with Inhomogeneous Profile Core", Journal of Lightwave Technology, IEEE, NY, US, vol. 14, No. 10, Oct. 1, 1996, pp. 2387–2394, XP000631544.

*Primary Examiner*—John R. Lee
*Assistant Examiner*—Zia R. Hashmi
(74) *Attorney, Agent, or Firm*—Sughrue Mion, PLLC

(57) ABSTRACT

The field of the invention is that of chromatic dispersion compensation modules and of methods of designing chromatic dispersion compensation modules. The design method includes an optimization step consisting in reducing an original quality criterion. The compensation optical fiber of the module has a chromatic dispersion less than a first threshold and chromatic dispersion sufficiently negative for the quality criterion to be less than a second threshold.

35 Claims, 8 Drawing Sheets

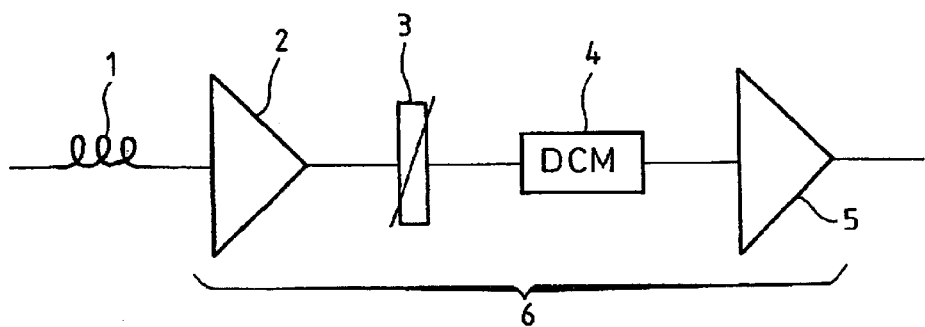
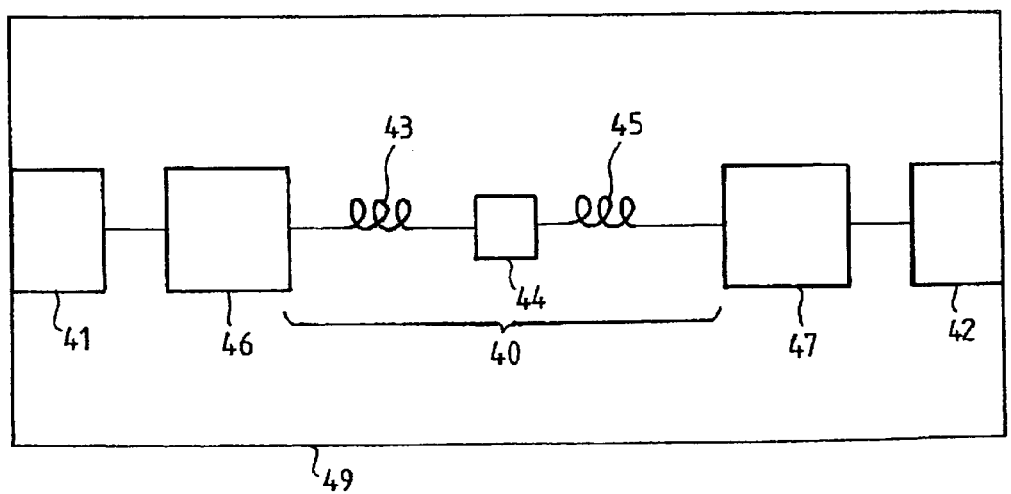

FIG_3

| Modules | $D_{DCM}$ (ps/nm) | $D_{DCF}$ (ps/nm-km) | $S_{DCF}$ (ps/nm²-km) | $D_{DCF}/S_{DCF}$ (nm) | $\alpha_{DCF}$ (dB/km) | $FOM_{HOM}$ (ps/nm-dB) | $\Gamma_{in}$ (dB) | $\Gamma_{inter}$ (dB) | $\Gamma_{out}$ (dB) | IL (dB) | $A_{eff}$ (µm²) | $n_2$ ($10^{-20}$m²/W) | NLC ($10^{-6}$km/W-dB) | CQ (dB) |
|---|---|---|---|---|---|---|---|---|---|---|---|---|---|---|
| A1 | -1360 | -210 | -0,70 | 300 | 0,70 | 300 | 1,00 | | 1,00 | 6,5 | 70 | 3 | 3,2 | 11,5 |
| A2 | -1360 | -300 | -1,00 | 300 | 0,60 | 500 | 1,00 | | 1,00 | 4,7 | 85 | 3 | 2,7 | 9,1 |
| A3 | -1360 | -350 | -1,14 | 307 | 0,70 | 500 | 1,00 | | 1,00 | 4,7 | 85 | 3 | 2,3 | 8,4 |
| A4 | -1360 | -365 | -1,19 | 307 | 0,75 | 487 | 1,00 | | 1,00 | 4,8 | 75 | 3 | 2,5 | 8,8 |
| B1 (2 fibres) | -1360 | -550 | -3,24 | 170 | 0,57 | 965 | 1,25 | 1,75 | 0,50 | 6,3 | 99 | 3 | 2,4 | 10,1 |
| B2 (2 fibres) | -1360 | -240 | -1,71 | 140 | 0,50 | 480 | 1,00 | 1,50 | 0,50 | 6,8 | 85 | 3 | 3,5 | 12,2 |
| B3 (2 fibres) | -1360 | -450 | -2,14 | 210 | 0,58 | 776 | 1,25 | 1,75 | 0,50 | 6,1 | 90 | 3 | 2,0 | 9,1 |

| Modules | $D_{DCM}$ (ps/nm) | $D_{DCF}$ (ps/nm·km) | $S_{DCF}$ (ps/nm²·µm) | $D_{DCF}/S_{DCF}$ (nm) | $\alpha_{DCF}$ (dB/km) | $FOM_{HOM}$ (ps/nm·dB) | $\Gamma_{in}$ (dB) | $\Gamma_{inter}$ (dB) | $\Gamma_{out}$ (dB) | IL (dB) | $A_{eff}$ (µm²) | $n_2$ ($10^{-20}$ m²/W) | NLC ($10^{-4}$ km/W·dB) | CQ (dB) |
|---|---|---|---|---|---|---|---|---|---|---|---|---|---|---|
| A5 | -680 | -340 | -1,90 | 179 | 0,60 | 567 | 1,25 | | 1,25 | 3,7 | 75 | 3 | 1,2 | 4,5 |
| A6 | -680 | -350 | -2,39 | 146 | 0,75 | 467 | 1,25 | | 1,25 | 4,0 | 75 | 3 | 1,1 | 4,5 |
| A7 | -680 | -310 | -2,05 | 151 | 0,75 | 413 | 1,25 | | 1,25 | 4,1 | 70 | 3 | 1,4 | 5,5 |
| B1 (2 fibres) | -680 | -450 | -7,15 | 63 | 0,75 | 600 | 1,25 | 1,35 | 0,10 | 4,3 | 65 | 3 | 1,9 | 7,1 |
| B2 (2 fibres) | -680 | -400 | -2,86 | 140 | 0,55 | 818 | 1,25 | 1,35 | 0,10 | 4,1 | 85 | 3 | 1,8 | 6,7 |
| C1 | -680 | -170 | -1,36 | 125 | 0,44 | 386 | 0,42 | | 0,42 | 2,6 | 65 | 3 | 3,2 | 7,6 |
| C2 | -680 | -210 | -1,68 | 125 | 0,45 | 467 | 0,42 | | 0,42 | 2,3 | 65 | 3 | 2,7 | 6,5 |
| C3 | -680 | -225 | -2,25 | 100 | 0,92 | 245 | 0,60 | | 0,60 | 4,0 | 65 | 3 | 2,1 | 7,1 |

FIG_4

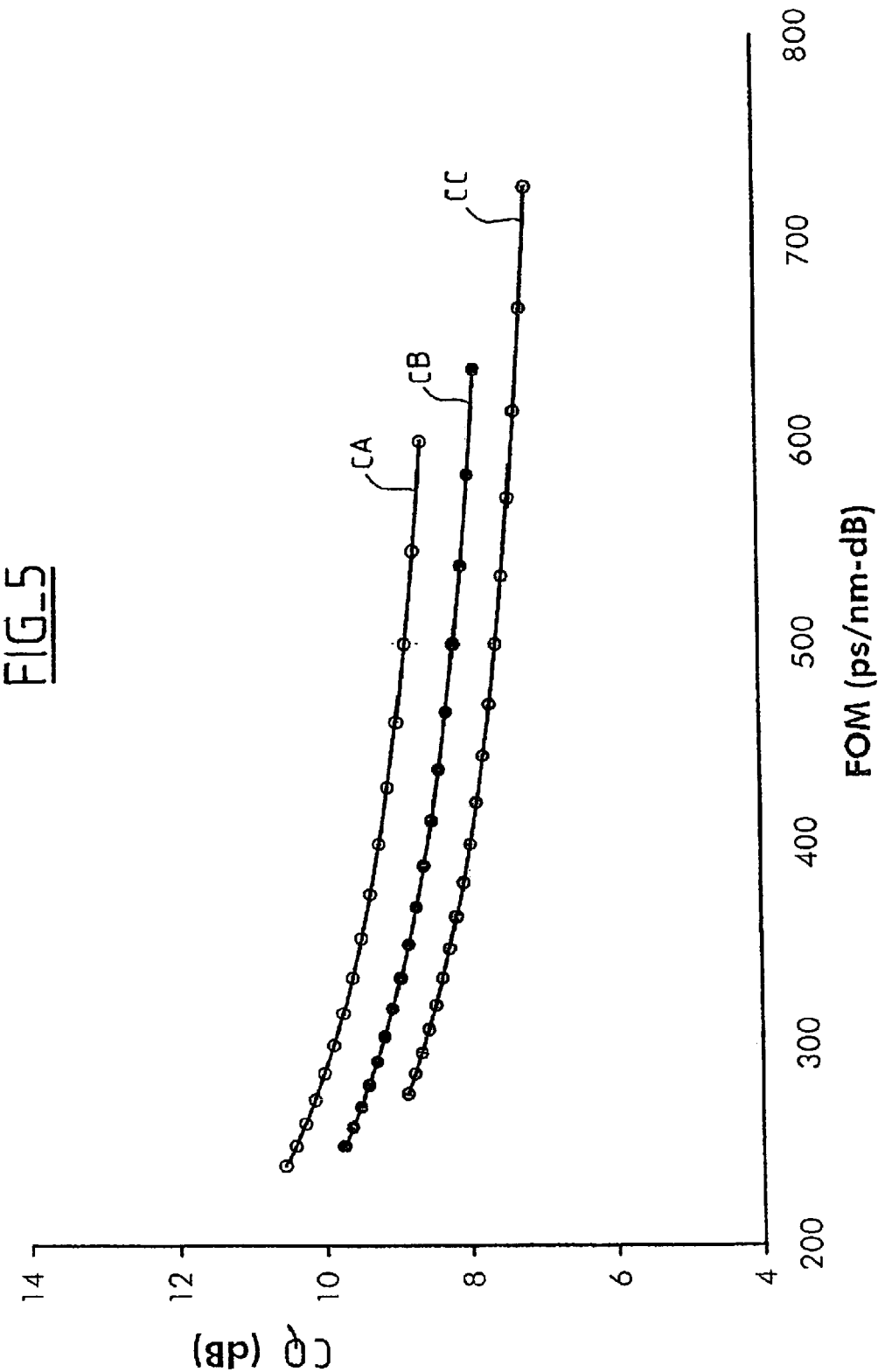
FIG_5

FIG_6

| | r1 (μm) | r2 (μm) | r3 (μm) | r4 (μm) | r5 (μm) | $10^3$Dn1 | $10^3$Dn2 | $10^3$Dn3 | $10^3$Dn4 | $10^3$Dn5 |
|---|---|---|---|---|---|---|---|---|---|---|
| A1 | 3.60 | 6.47 | 9.80 | 14.00 | | 30.0 | 3.3 | 0.0 | 0.7 | |
| A2 | 3.70 | 8.86 | 15.79 | | | 29.0 | 2.3 | 1.3 | | |
| A3 | 3.69 | 6.22 | 8.28 | 12.05 | 15.06 | 30.0 | -0.9 | 6.1 | -4.0 | 4.2 |
| A4 | 3.63 | 5.15 | 8.09 | 11.76 | 14.70 | 32 | -4.3 | 4.8 | -3.7 | 4.3 |
| A5 | 3.98 | 5.40 | 8.48 | 11.67 | 15.42 | 28.3 | -7.0 | 4.7 | -3.4 | 3.3 |
| A6 | 3.60 | 6.40 | 16.00 | | | 30.0 | 1.1 | 0.7 | | |
| A7 | 3.63 | 8.30 | 9.53 | 13.61 | | 30.0 | 1.4 | -1.1 | 1.4 | |

FIG_7

| | Type | $S_{eff}$ μm² | Dispersion ps/nm·km | | | Pente ps/nm²·km | | | | | | | λmin nm | Variation maximale de Pente % | | |
|---|---|---|---|---|---|---|---|---|---|---|---|---|---|---|---|---|
| | | 1550nm | 1550nm | 1530 | 1550 | 1565 | 1570 | 1580 | 1590 | 1605 | | | 1530-1565 | 1530-1580 | 1530-1605 |
| A1 | 4 T | 70 | -210 | -0.68 | -0.70 | -0.70 | -0.70 | -0.68 | -0.66 | -0.60 | 1660 | 3 | 3 | 14 |
| A2 | 3 T | 85 | -300 | -1.23 | -1.00 | -0.71 | -0.59 | -0.32 | -0.01 | 0.49 | 1590 | 7 | - | - |
| A3 | 5 T | 85 | -350 | -1.21 | -1.14 | -1.14 | -1.15 | -1.17 | -1.16 | -0.95 | 1625 | 6 | 6 | 23 |
| A4 | 5 T | 75 | -365 | -1.30 | -1.19 | -1.17 | -1.18 | -1.22 | -1.27 | -1.26 | 1635 | 11 | 11 | 11 |
| A5 | 5 T | 75 | -340 | -1.86 | -1.90 | -1.93 | -1.93 | -1.91 | -1.82 | -1.42 | 1625 | 4 | 4 | 26 |
| A6 | 3 T | 75 | -350 | -2.20 | -2.39 | -2.38 | -2.32 | -2.09 | -1.72 | -0.77 | 1615 | 8 | 13 | - |
| A7 | 4 T | 70 | -310 | -1.85 | -2.05 | -2.12 | -2.12 | -2.05 | -1.87 | -1.34 | 1630 | 13 | 13 | 37 |

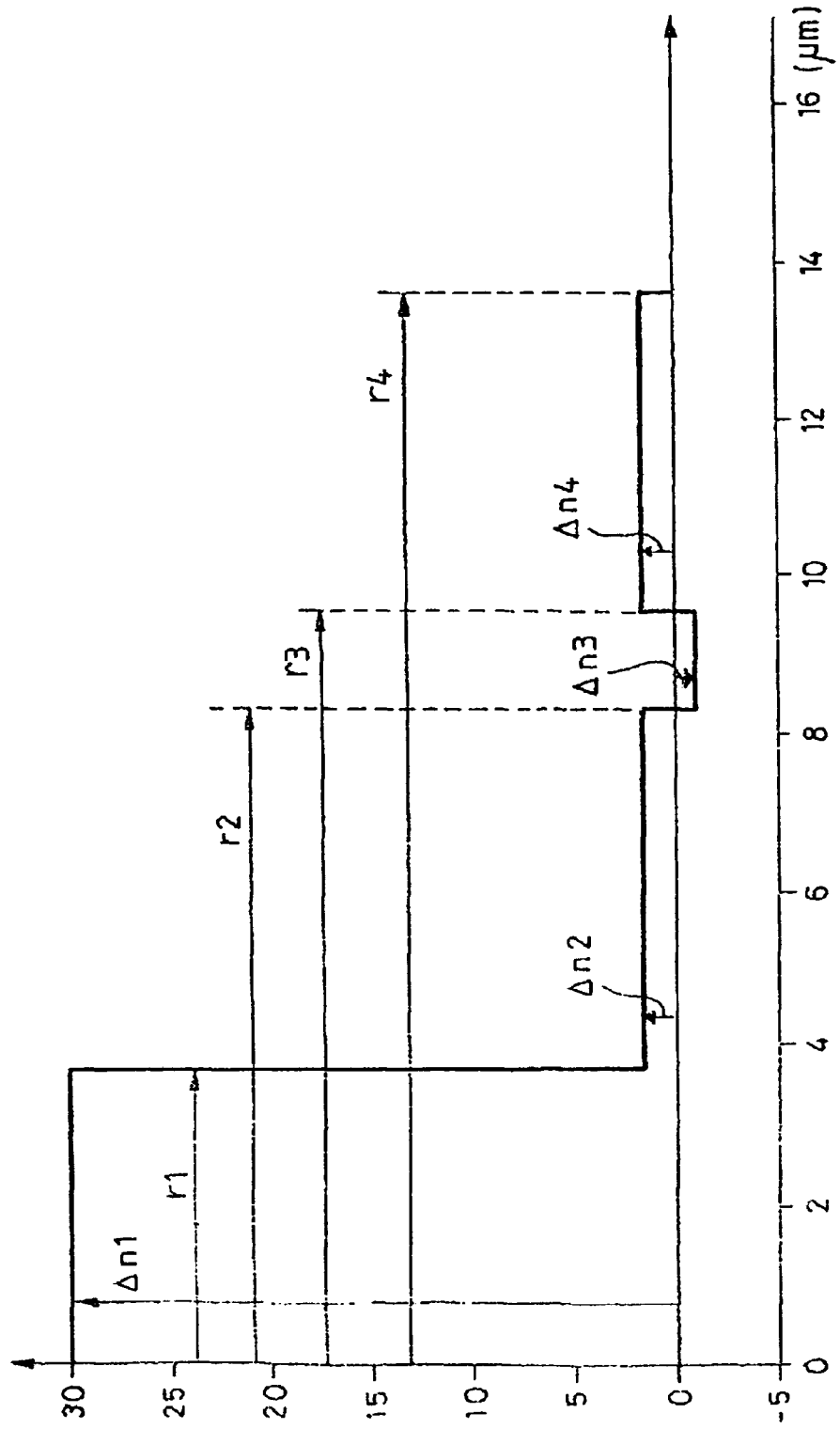
FIG_8

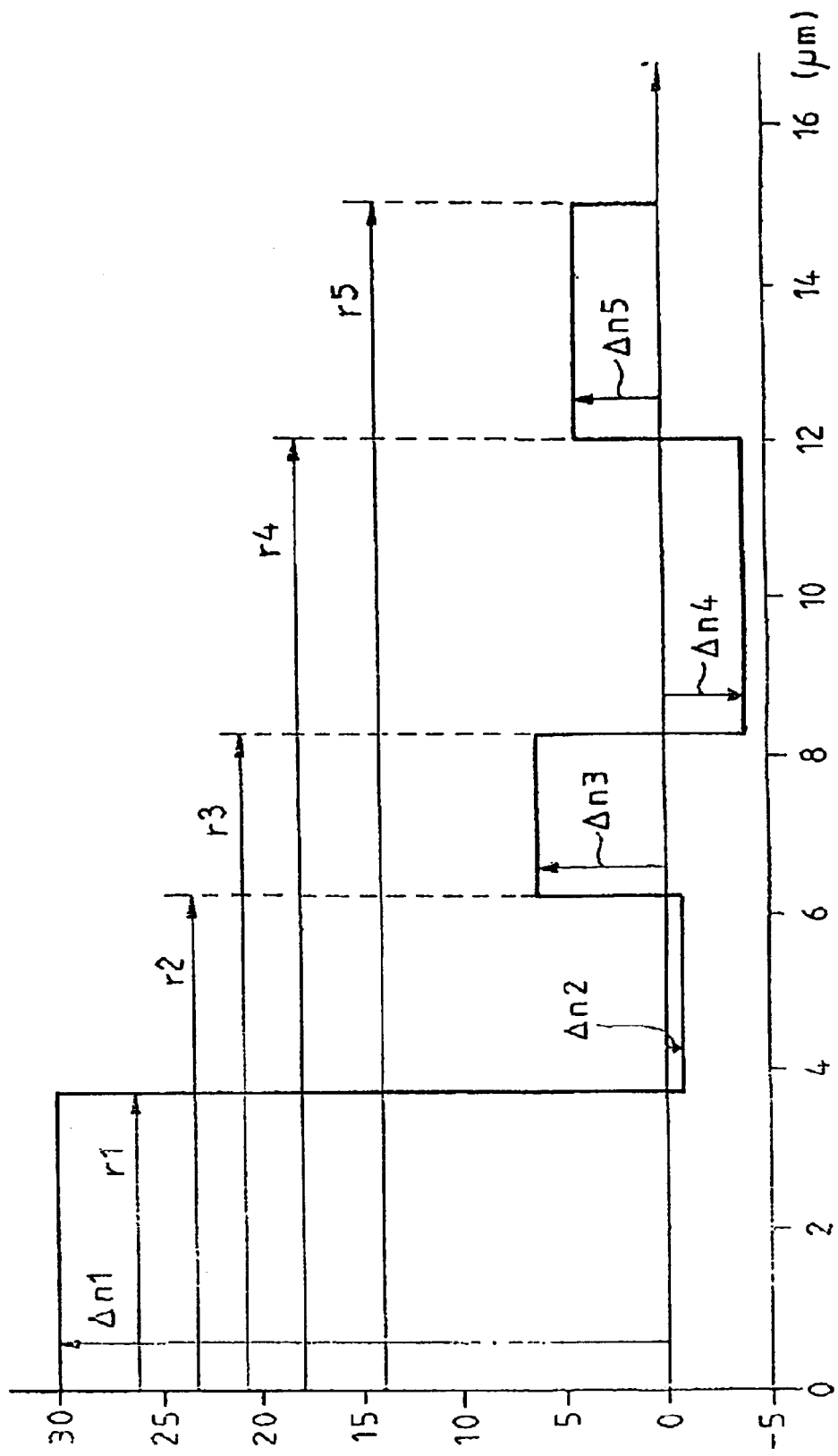
FIG_9

CHROMATIC DISPERSION COMPENSATION MODULE

This is a Continuation-In-Part of application Ser. No. 10/289,439 filed Nov. 7, 2002; the disclosure of which is incorporated herein by reference.

The field of the invention is that of chromatic dispersion compensation modules. The terms "attenuation" and "attenuation coefficient" are used interchangeably with regard to optical fibers.

In some wavelength division multiplexing (WDM) optical fiber transmission networks including line optical fibers in which an optical signal propagates, there are no means for compensating the chromatic dispersion of the line optical fibers. When the bit rate is low, for example 2.5 gigabits per second (Gbit/s) per channel, it is not necessary to compensate the chromatic dispersion of the line optical fibers. However, as the bit rate increases to high values, for example 10 Gbit/s per channel, it becomes necessary to compensate the chromatic dispersion and the dispersion slope of line optical fibers. A line optical fiber generally has positive chromatic dispersion and positive dispersion slope. Consequently, a chromatic dispersion compensating optical fiber will generally have negative chromatic dispersion and negative dispersion slope. The chromatic dispersion compensation optical fiber can be integrated into a chromatic dispersion compensation module. The spectral range within which chromatic dispersion is to be compensated can include one or more of bands C, L and S.

The optical signal propagates in the chromatic dispersion compensation optical fiber. As it propagates in the chromatic dispersion compensation optical fiber, the optical signal is liable to deteriorate, for example to suffer a decrease in the signal-to-noise ratio or an increase in non-linear effects. A chromatic dispersion compensation module for compensating the chromatic dispersion of a segment of line optical fiber, which is usually several tens of kilometers (km) long, generally has insertion losses that are relatively high, of the order of several decibels (dB). Because of the magnitude of its insertion losses, the chromatic dispersion compensation module is generally placed at the center of a two-stage amplifier system, i.e. between two amplifiers.

For the two-stage amplifier system to have a good optical signal-to-noise ratio and gain across the spectrum that is flat, the two-stage amplifier system presents a first amplifier with high gain, which yields high optical power at the output of the first amplifier, and it presents losses between the two amplifiers at a level that is fixed.

The chromatic dispersion compensation optical fiber integrated into the chromatic dispersion compensation module is a high-order mode (HOM) multimode optical fiber which has a very large effective area, for example of the order of 80 square micrometers ($\mu m^2$), which makes it much less sensitive to non-linear effects than a single-mode optical fiber; however, HOM multimode optical fibers nevertheless have some sensitivity to non-linear effects. To preserve good optical signal transmission quality it can be beneficial to limit the optical power input into an HOM multimode chromatic dispersion compensation optical fiber. To achieve this, an attenuator can be placed between the first amplifier and the chromatic dispersion compensation module. The attenuator also controls the flatness of the gain across the spectrum. The attenuator can be replaced by a wavelength routing component or by any other optical component that has losses and can therefore, like an attenuator, limit the optical power input into the chromatic dispersion compensation module.

The problem is to produce a chromatic dispersion compensation module offering the best possible quality. The cost of a chromatic dispersion compensation module based on HOM multimode compensation optical fiber is relatively high because it includes the cost of the mode converters situated at the upstream and downstream ends of the HOM multimode compensation optical fibers. However, this kind of compensation module can be more effective than a compensation module based on single-mode compensation optical fiber, because of the very highly negative values of the chromatic dispersion of the compensation optical fiber and because of the much greater ability of HOM multimode fibers with a very large effective area to withstand non-linear effects.

One prior art compensation module is based on the use of an HOM multimode compensation optical fiber that does not have a very highly negative value for chromatic dispersion, in order to be able to achieve a chromatic dispersion to dispersion slope ratio that is sufficiently high to compensate not only the chromatic dispersion but also the dispersion slope of the line optical fiber. A drawback of that first prior art is that it does not fully obtain the benefits of the very highly negative values of chromatic dispersion that HOM multimode optical fibers can achieve. Another drawback of that first prior art is its poor multiple path interference (MPI) performance, although it has good performance in terms of insertion losses. Using Bragg grating converters on compensation optical fibers has the advantage of reducing the insertion losses but the disadvantage of poor MPI. In conclusion, the improvement in insertion losses degrades ability to withstand non-linear effects.

A second prior art compensation module is based on the use of a combination of an HOM multimode compensation optical fiber having a very highly negative value of chromatic dispersion together with a single-mode compensation optical fiber in order to obtain a chromatic dispersion to dispersion slope ratio that is sufficiently high for the compensation optical line to compensate not only the chromatic dispersion but also the dispersion slope of the line optical fiber. One drawback of that prior art is its complex design and the resulting complexity of the process of fabricating the compensation module. Another drawback is that it does not provide compensation in a very wide spectral band. A further drawback is that it loses to at least some degree an essential advantage of HOM multimode compensation optical fibers, namely their large effective area, as a result of associating them with a single-mode compensation optical fiber whose effective area is much smaller. Moreover, high losses occur at the connection between the HOM multimode compensation optical fiber and the single-mode compensation optical fiber, which further increases the already high insertion losses; indeed, the presence of a connector is unavoidable, which does not apply to the junction between two HOM multimode compensation optical fibers. In conclusion, improving the ability to withstand non-linear effects increases the complexity of the module and degrades insertion losses.

The object of the invention is to propose a high quality chromatic dispersion compensation module fully exploiting the benefits of HOM multimode optical fibers. To this end, the compensation module of the invention does not contain any single-mode optical fiber. However, the question then arises: how is the quality of a chromatic dispersion compensation module to be evaluated?

Prior art methods of improving the quality of a compensation module are based on unilaterally improving a parameter that is partially representative of the quality of the compensation module. Unilaterally improving only one parameter that is partially representative of the quality of the compensation module, whether that parameter be insertion losses or non-linear phase, has two consequences. Firstly, it increases the cost of the compensation module. Secondly, it tends to degrade the other parameter that is partially representative of the quality of the compensation module, so the quality of the compensation module is improved less than desired, and possibly only little or not at all.

The method of the invention of improving the quality of a compensation module is completely different. Firstly, it creates a quality criterion which is globally representative of the quality of a compensation module and which integrates, with appropriate weighting, the contribution of the insertion losses and the contribution of the non-linear effects. The contribution of the insertion losses corresponds to the conventional insertion losses except that it is related to full compensation of the line optical fiber, while the contribution of the non-linear effects is reflected in a non-linearity criterion related to but separate from the non-linear phase. The non-linearity criterion is obtained by judicious simplification of the non-linear phase to take account of the constant nature of the losses between the two amplifiers of the two-stage amplification system. Optimizing this novel quality criterion either significantly improves the insertion losses without excessively degrading ability to withstand non-linear effects, and thus globally improves the quality of the compensation module, or significantly improves ability to withstand non-linear effects without excessively degrading the insertion losses, and thus globally improves the quality of the compensation module.

According to a first aspect of the invention, the quality of the compensation module of the invention as measured by the novel quality criterion previously described is high. To obtain not only a very highly negative value for chromatic dispersion but also a chromatic dispersion to dispersion slope ratio that is not only sufficiently high but also highly linear as a function of wavelength, the number of core segments in the core of the compensation optical fiber is preferably relatively high. In an application with relatively few channels in a spectral band, where linearity can be sacrificed to some degree, compensation optical fibers whose core comprises few core segments are acceptable.

According to a second aspect of the invention, the compensation module of the invention uses at least one compensation optical fiber whose core comprises a large number of core segments in order to be able to reconcile a very highly negative value of chromatic dispersion and a chromatic dispersion to dispersion slope ratio that is not only high but also has good linearity as a function of wavelength. The core segments are preferably rectangular, as in the examples described hereinafter; the core segments can also nevertheless be triangular or alpha-shaped; likewise, some core segments can have one particular shape and other core segments a different shape.

The first aspect of the invention therefore proposes a compensation module design method and two compensation modules, one suited to compensating a standard single-mode line optical fiber (SMF) and the other suited to compensating a non-zero dispersion shifted single-mode line optical fiber (NZ-DSF). The second aspect of the invention therefore proposes two compensation modules, one suited to compensating a standard single-mode line optical fiber and the other suited to compensating a non-zero dispersion shifted single-mode line optical fiber.

In the first aspect of the invention, there is provided a method of designing a chromatic dispersion compensation module, said module being adapted to comprise, an enclosure including an input terminal and an output terminal, a higher-order mode chromatic dispersion compensation optical line situated inside the enclosure and disposed between the input terminal and the output terminal, the line comprising one or more HOM multimode chromatic dispersion compensation optical fibers in series and not comprising any single-mode optical fiber, an input mode converter for converting the fundamental mode into said higher order mode, situated between the input terminal and the compensation optical line, an output mode converter for converting said higher order mode into the fundamental mode, situated between the compensation optical line and the output terminal, said module being adapted to be inserted by means of the input and output terminals into a transmission line comprising a single-mode line optical fiber adapted to transmit information in a spectral domain of use, the input terminal and the input mode converter together introducing into the transmission line an input loss $\Gamma_{in}$ expressed in dB, the output terminal and the output mode converter together introducing into the transmission line an output loss $\Gamma_{out}$ expressed in dB, additional connections, if any, between compensation optical fibers together introducing into the transmission line a connection loss $\Gamma_{inter}$ expressed in dB, the compensation optical fiber or the set of compensation optical fibers in series presenting, at a wavelength of 1550 nanometers (nm), a plurality of average parameters including an average coefficient of attenuation $\alpha_{DCF}$ expressed in decibels per kilometer (dB/km), an average chromatic dispersion $D_{DCF}$ expressed in picoseconds per nanometer-kilometer (ps/nm-km) and that is negative, an average dispersion slope $S_{DCF}$ expressed in picoseconds per nanometer squared-kilometer (ps/nm²-km) and that is negative, an average chromatic dispersion to dispersion slope ratio $D_{DCF}/S_{DCF}$ expressed in nm, an average figure of merit $FOM_{DCF}$ defined as $-D_{DCF}/\alpha_{DCF}$ expressed in picoseconds per nanometer-decibel (ps/nm-dB), an average effective area $A_{eff}$ expressed in $\mu m^2$, and an average second order coefficient $n_2$ of the refractive index as a function of the intensity expressed in $10^{-20}$ square meters per watt (m²/W), the average chromatic dispersion to dispersion slope ratio being the ratio between the average chromatic dispersion and the average dispersion slope, the average figure of merit being the negative of the ratio between the average chromatic dispersion and the average coefficient of attenuation, the average coefficient of attenuation in the case of a single compensation optical fiber being lumped with the corresponding coefficient of attenuation of said single compensation optical fiber and in the case of a set of compensation optical fibers in series, the average coefficient of attenuation is equal to the sum of the corresponding attenuation coefficients of the various compensation optical fibers weighted by their respective contributions to the total series length of the compensation optical fibers plus the ratio of the connection loss divided by said total length, each of said other average parameters in the case of a single compensation optical fiber being lumped with the corresponding parameter of said single compensation optical fiber and each of said other average parameters in the case of a set of compensation optical fibers in series being the arithmetic mean of the corresponding parameters of the various compensation optical fibers when weighted by the respective lengths of said various compensation optical fibers, said module being adapted to present insertion losses IL expressed in dB,
where $$IL = \frac{D_{DCM}}{D_{DCF}} \cdot \alpha_{DCF} + \Gamma_{in} + \Gamma_{out}$$

and where $D_{DCM}$ represents the negative of the cumulative dispersion of the line optical fiber, said module being adapted to have a non-linearity criterion NLC representing the effects of the non-linear phase and expressed in $10^{-6}$ kilometers per watt-decibel (km/W-dB),
where $$NLC = \frac{100 \cdot n_2 \cdot \left(1 - 10^{\frac{D_{DCM}}{10 \cdot FOM_{DCF}}}\right)}{A_{eff} \cdot \alpha_{DCF} \cdot 10^{\frac{\Gamma_{in}}{10}}},$$

said module being adapted to present a quality criterion CQ expressed in dB,
where CQ=IL+10 log NLC,
said design method including an optimization step for optimizing said module, said optimization step consisting in reducing the quality criterion.

In the first aspect of the invention, to compensate a standard single-mode line optical fiber, there is also provided,
a chromatic dispersion compensation module comprising,
an enclosure including an input terminal and an output terminal,
a higher-order mode chromatic dispersion compensation optical line situated inside the enclosure and disposed between the input terminal and the output terminal, the line comprising one or more HOM multimode chromatic dispersion compensation optical fibers in series and not comprising any single-mode optical fiber,
an input mode converter for converting the fundamental mode into said higher order mode, situated between the input terminal and the compensation optical line,
an output mode converter for converting said higher order mode into the fundamental mode, situated between the compensation optical line and the output terminal,
the module being adapted to be inserted by means of the input and output terminals into a transmission line comprising a standard single-mode line optical fiber adapted to transmit information in a spectral domain of use,
the input terminal and the input mode converter together introducing into the transmission line an input loss $\Gamma_{in}$ expressed in dB,
the output terminal and the output mode converter together introducing into the transmission line an output loss $\Gamma_{out}$ expressed in dB,
additional connections, if any, between compensation optical fibers together introducing into the transmission line a connection loss $\Gamma_{inter}$ expressed in dB,
the compensation optical fiber or the set of compensation optical fibers in series presenting, at a wavelength of 1550 nm, a plurality of average parameters including an average coefficient of attenuation $\alpha_{DCF}$ expressed in dB/km, an average chromatic dispersion $D_{DCF}$ expressed in ps/nm-km and that is negative, an average dispersion slope $S_{DCF}$ expressed in ps/nm²-km and that is negative, an average chromatic dispersion to dispersion slope ratio $D_{DCF}/S_{DCF}$ expressed in nm, an average figure of merit $FOM_{DCF}$ defined as $-D_{DCF}/\alpha_{DCF}$ expressed in ps/nm-dB, an average effective area $A_{eff}$ expressed in $\mu m^2$, and an average second order coefficient $n_2$ of the refractive index as a function of the intensity expressed in $10^{-20}$ m²/W,
the average chromatic dispersion to dispersion slope ratio being the ratio between the average chromatic dispersion and the average dispersion slope,
the average figure of merit being the negative of the ratio between the average chromatic dispersion and the average coefficient of attenuation,
the average coefficient of attenuation in the case of a single compensation optical fiber being lumped with the corresponding coefficient of attenuation of said single compensation optical fiber and in the case of a set of compensation optical fibers in series, the average coefficient of attenuation is equal to the sum of the corresponding attenuation coefficients of the various compensation optical fibers weighted by their respective contributions to the total series length of the compensation optical fibers plus the ratio of the connection loss divided by said total length,
each of said other average parameters in the case of a single compensation optical fiber being lumped with the corresponding parameter of said single compensation optical fiber and each of said other average parameters in the case of a set of compensation optical fibers in series being the arithmetic mean of the corresponding parameters of the various compensation optical fibers when weighted by the respective lengths of said various compensation optical fibers,
the module having insertion losses IL expressed in dB, where $$IL = \frac{D_{DCM}}{D_{DCF}} \cdot \alpha_{DCF} + \Gamma_{in} + \Gamma_{out}$$

and where $D_{DCM}$=−1360 ps/nm,
the module having a non-linearity criterion NLC representing the effects of the non-linear phase and expressed in $10^{-6}$ km/W-dB,
where $$NLC = \frac{100 \cdot n_2 \cdot \left(1 - 10^{\frac{D_{DCM}}{10 \cdot FOM_{DCF}}}\right)}{A_{eff} \cdot \alpha_{DCF} \cdot 10^{\frac{\Gamma_{in}}{10}}},$$

the module having a quality criterion CQ expressed in dB,
where CQ=IL+10 log NLC, and
the compensation optical fiber or the set of compensation optical fibers in series presenting: firstly, an average chromatic dispersion more negative than −200 ps/nm-km, secondly, an average chromatic dispersion to dispersion slope ratio in the range 240 nm to 400 nm, and thirdly, an average chromatic dispersion sufficiently negative for the quality criterion to be less than 9.5 dB.

In the first aspect of the invention, in order to compensate a non-zero dispersion shifted single-mode line optical fiber, there is further provided a chromatic dispersion compensation module comprising,
an enclosure including an input terminal (41) and an output terminal,
a higher-order mode chromatic dispersion compensation optical line situated inside the enclosure and disposed between the input terminal and the output terminal, the line comprising one or more HOM multimode chromatic dispersion compensation optical fibers in series and not comprising any single-mode optical fiber, an input mode converter for converting the fundamental mode into said higher order mode, situated between the input terminal and the compensation optical line, an output mode converter for converting said higher order mode into the fundamental mode, situated between the compensation optical line and the output terminal, the module being adapted to be inserted by means of the input and output terminals into a transmission line comprising a single-mode non-zero (at 1550 nm) dispersion shifted line optical fiber adapted to transmit information in a spectral domain of use, the input terminal and the input mode converter together introducing into the transmission line an input loss $\Gamma_{in}$ expressed in dB, the output terminal and the output mode converter together introducing into the transmission line an output loss $\Gamma_{out}$ expressed in dB, additional connections, if any, between compensation optical fibers together introducing into the transmission line a connection loss $\Gamma_{inter}$ expressed in dB, the compensation optical fiber or the set of compensation optical fibers in series presenting, at a wavelength of 1550 nm, a plurality of average parameters including an average coefficient of attenuation $\alpha_{DCF}$ expressed in dB/km, an average chromatic dispersion $D_{DCF}$ expressed in ps/nm-km and that is negative, an average dispersion slope $S_{DCF}$ expressed in ps/nm²-km and that is negative, an average chromatic dispersion to dispersion slope ratio $D_{DCF}/S_{DCF}$ expressed in nm, an average figure of merit $FOM_{DCF}$ defined as $-D_{DCF}/\alpha_{DCF}$ expressed in ps/nm-dB, an average effective area $A_{eff}$ expressed in $\mu m^2$, and an average second order coefficient $n_2$ of the refractive index as a function of the intensity expressed in $10^{-20}$ m²/W, the average chromatic dispersion to dispersion slope ratio being the ratio between the average chromatic dispersion and the average dispersion slope, the average figure of merit being the negative of the ratio between the average chromatic dispersion and the average coefficient of attenuation, the average coefficient of attenuation in the case of a single compensation optical fiber being lumped with the corresponding coefficient of attenuation of said single compensation optical fiber and in the case of a set of compensation optical fibers in series, the average coefficient of attenuation is equal to the sum of the corresponding attenuation coefficients of the various compensation optical fibers weighted by their respective contributions to the total series length of the compensation optical fibers plus the ratio of the connection loss divided by said total length, each of said other average parameters in the case of a single compensation optical fiber being lumped with the corresponding parameter of said single compensation optical fiber and each of said other average parameters in the case of a set of compensation optical fibers in series being the arithmetic mean of the corresponding parameters of the various compensation optical fibers when weighted by the respective lengths of said various compensation optical fibers, the module having insertion losses IL expressed in dB, where $$IL = \frac{D_{DCM}}{D_{DCF}} \cdot \alpha_{DCF} + \Gamma_{in} + \Gamma_{out}$$

and where
$D_{DCM}$=−680 ps/nm, the module having a non-linearity criterion NLC representing the effects of the non-linear phase and expressed in $10^{-6}$ km/W-dB, where $$NLC = \frac{100 \cdot n_2 \cdot \left(1 - 10^{\frac{D_{DCM}}{10 \cdot FOM_{DCF}}}\right)}{A_{eff} \cdot \alpha_{DCF} \cdot 10^{\frac{\Gamma_{in}}{10}}},$$

the module having a quality criterion CQ expressed in dB, where CQ=IL+10 log NLC, and the compensation optical fiber or the set of compensation optical fibers in series presenting: firstly, an average chromatic dispersion more negative than −250 ps/nm-km and, secondly, an average chromatic dispersion sufficiently negative for the quality criterion to be less than 5.5 dB.

Although less pertinent in the context of use with an amplification and compensation system other than the two-stage amplification and compensation system described above, the quality criterion remains valid and useful. The invention is not restricted to a two-stage amplification and compensation system of the type described above. The very low, and therefore very good, quality criterion values obtained with compensation modules of the invention make it possible to envisage using compensation modules of the invention in an amplification and compensation system including only one amplifier and no attenuator, in which case the compensation module of the invention would be situated downstream of the amplifier. This would also be possible in an amplification and compensation system including only one amplifier, either with an attenuator between the amplifier and the compensation module or, if there is no attenuator, with the compensation module upstream of the amplifier.

In the second aspect of the invention, in order to compensate a standard single-mode line optical fiber, there is further provided a chromatic dispersion compensation module comprising, an enclosure including an input terminal and an output terminal, a higher-order mode chromatic dispersion compensation optical line situated inside the enclosure and disposed between the input terminal and the output terminal, the line comprising one or more HOM multimode chromatic dispersion compensation optical fibers in series and not comprising any single-mode optical fiber, an input mode converter for converting the fundamental mode into said higher order mode, situated between the input terminal and the compensation optical line, an output mode converter for converting said higher order mode into the fundamental mode, situated between the compensation optical line and the output terminal, the module being adapted to be inserted by means of the input and output terminals into a transmission line comprising a standard single-mode line optical fiber adapted to transmit information in a spectral domain of use, and the compensation optical fiber or at least one of the compensation optical fibers in series having a core having at least five core segments, to which core cladding is added, so that said optical fiber having a core with at least five core segments simultaneously has, at a wavelength of 1550 nm, chromatic dispersion more negative than −300 ps/nm-km and a chromatic dispersion to dispersion slope ratio greater than 200 nm.

In the second aspect of the invention, in order to compensate a non-zero dispersion shifted single-mode line optical fiber, there is further provided a chromatic dispersion compensation module comprising, an enclosure including an input terminal and an output terminal, a higher-order mode chromatic dispersion compensation optical line situated inside the enclosure and disposed between the input terminal and the output terminal, the line comprising one or more HOM multimode chromatic dispersion compensation optical fibers in series and not comprising any single-mode optical fiber, an input mode converter for converting the fundamental mode into said higher order mode, situated between the input terminal and the compensation optical line, an output mode converter for converting said higher order mode into the fundamental mode, situated between the compensation optical line and the output terminal, the module being adapted to be inserted by means of the input and output terminals into a transmission line comprising a single-mode non-zero (at 1550 nm) dispersion shifted line optical fiber adapted to transmit information in a spectral domain of use, and the compensation optical fiber or at least one of the compensation optical fibers in series having a core having at least four core segments, to which core cladding is added, so that said optical fiber having a core with at least four core segments simultaneously has, at a wavelength of 1550 nm, chromatic dispersion more negative than −300 ps/nm-km and a chromatic dispersion to dispersion slope ratio greater than 80 nm.

The second aspect of the invention is not restricted to a two-stage amplification and compensation system of the type described above.

The invention will be more clearly understood and other features and advantages will become apparent in the light of the following description and the accompanying drawings, which are provided by way of example, and in which:

FIG. 1 is a diagram showing an example of a transmission line integrating a compensation module of the invention;

FIG. 2 is a diagram showing an example of a compensation module of the invention;

FIG. 3 is a table comparing the relative performance of prior art compensation modules and examples of compensation modules of the invention in the case of compensating a standard single-mode line optical fiber;

FIG. 4 is a table comparing the relative performance of prior art compensation modules and examples of compensation modules of the invention in the case of compensating a non-zero dispersion shifted single-mode line optical fiber;

FIG. 5 is a diagram showing a family of curves plotting the variation in the quality criterion as a function of the figure of merit of the compensation optical fiber at a chosen constant chromatic dispersion for the compensation optical fiber in the case of compensating a standard single-mode line optical fiber;

FIG. 6 is a table setting out absolute radius and maximum index difference values for a few examples of HOM multimode compensation optical fiber profiles used in a compensation module of the invention;

FIG. 7 is a table setting out other properties of the HOM multimode compensation optical fiber profiles shown in FIG. 6;

FIG. 8 is a diagram showing an example of a core profile with four core segments of an HOM multimode compensation optical fiber used in a compensation module of the invention; and FIG. 9 is a diagram showing an example of a core profile with five core segments of an HOM multimode compensation optical fiber used in a compensation module of the invention.

Parameters and criteria that are used throughout the remainder of the text are defined next. There are two situations to consider: either the module comprises a single compensation optical fiber, which fiber has parameters, or the module comprises a plurality of compensation optical fibers in series, constituting a set of fibers which has average parameters. For simplicity, in all of FIGS. 1 to 9 the compensation module is considered to comprise only one compensation optical fiber and the qualifier "average" in the definition of the parameters may be disregarded.

When the compensation module comprises only one compensation optical fiber, the module has the great advantage that its design and fabrication are simplified.

When the compensation module comprises a plurality of compensation optical fibers from the same family, i.e. either a plurality of segments taken from one and the same compensation optical fiber or from different production runs of the same compensation optical fiber, and therefore subject to slight differences caused by fabrication tolerances, and once the optical fibers are matched and assembled together, the fibers provide some properties that are defined with great accuracy, despite wider fabrication tolerances, for example more accurate compensation of the dispersion slope or the chromatic dispersion to dispersion slope ratio of the line optical fiber. The compensation optical fibers of the same family are preferably connected together directly, but they could be connected together by means of connectors. The compensation module has the advantages of simplicity of design and of improvement to some of its properties.

When the compensation module comprises a plurality of separate compensation optical fibers that are matched and assembled together, they provide compensation over a very wide spectral band, i.e. over at least two of the spectral bands S, C and L. The S, C and L spectral bands respectively range from approximately 1460 nanometers (nm) to approximately 1530 nm, from approximately 1530 nm to approximately 1565 nm, and from approximately 1565 nm to approximately 1615 nm. However, the compensation module then has the drawback that it is difficult to design and produce. In the second prior art modules, the use of the combination of an HOM multimode compensation optical fiber and a single-mode compensation optical fiber with a very large effective area resulting from the positive sign of the dispersion slope and mediocre bending and microbending performance, which prevents compensation over a very wide band, i.e. compensation over a plurality of spectral bands at one and the same time because of the excessively high level of bending and microbending losses that would result at high wavelengths, which would not be the case with two HOM multimode optical fibers. In the case of this kind of combination of multimode HOM compensation optical fiber with single mode fiber, whether single-mode compensation optical fiber or standard single-mode or non-zero dispersion shifted compensation optical fiber, the figure of merit of the chosen HOM multimode optical fiber must be much higher and is therefore more difficult to achieve than that which is necessary in the absence of single-mode compensation optical fiber, for comparable values of the quality criterion.

Consider two fibers having respective lengths $l1$ and $l2$, respective coefficients of attenuation per unit length $a1$ and $a2$, and a connection loss $pc$ between the two fibers. The average coefficient of attenuation per unit length $am$ of all of the compensation optical fibers in series has the value $am=(a1.l1+a2.l2+pc)/(l1+l2)$. This type of calculation of the average attenuation coefficient can be generalized to more than two compensation optical fibers in series. Only the average coefficient of attenuation, which is a special case of the optical fiber parameters, is calculated in this manner, and all the other average parameters are calculated in other ways.

Consider two optical fibers with respective lengths l1 and l2 and respective chromatic dispersions per unit length c1 and c2. The average chromatic dispersion per unit length cm of all of the compensation optical fibers in series has the value cm=(c1.l1+c2.l2)/(l1+l2). This type of average chromatic dispersion calculation can be generalized to more than two compensation optical fibers in series. All the other average parameters, with the exception of the average coefficient of attenuation, the average chromatic dispersion to dispersion slope ratio, and the average figure of merit, are calculated in this manner, namely, the average dispersion slope, the average effective area, and the average second order coefficient, conventionally designated $n_2$, of the refractive index of the optical fiber as a function of the intensity of the optical signal propagating in the optical fiber. The average chromatic dispersion to dispersion slope ratio is the ratio between the average chromatic dispersion and the average dispersion slope. The average figure of merit is the negative of the ratio between the average chromatic dispersion and the average coefficient of attenuation.

There is an exact non-linearity criterion formula in the case of two compensation optical fibers in series, referred to as optical fiber a and optical fiber b, for example. The exponents a and b of the various parameters represent those parameters for the optical fibers a and b, respectively.

The exact formula, in which $\Gamma_{in}^b = \Gamma_{inter}$ in the case of two compensation optical fibers in series, is as follows:

$$NLC = 100 \cdot \left( \frac{n_2^a}{A_{eff}^a \cdot \alpha_{DCF}^a \cdot 10^{\left(\frac{\Gamma_{in}^a}{10}\right)}} \left[1 - 10^{\left(\frac{D_{DCM}^a}{10 \cdot FOM_{DCF}^a}\right)}\right] + \right.$$

$$\left. \frac{10^{\left(\frac{D_{DCM}^a \cdot \alpha_{DCF}^b}{10 \cdot FOM_{DCF}^a \cdot \alpha_{DCF}^a}\right)} \cdot n_2^b}{A_{eff}^b \cdot \alpha_{DCF}^b \cdot 10^{\left(\frac{\Gamma_{in}^a + \Gamma_{in}^b}{10}\right)}} \left[1 - 10^{\left(\frac{D_{DCM}^b}{10 \cdot FOM_{DCF}^b}\right)}\right] \right)$$

However, approximate formulas obtained from the average parameters of the compensation optical line yield excellent results that are very similar to those obtained using the exact formula. This is why the approximate formula is used.

The chromatic dispersion compensation module comprises a chromatic dispersion compensation optical line and an enclosure having an input terminal and an output terminal. The higher-order mode chromatic dispersion compensation optical line comprises one or more HOM multimode chromatic dispersion compensation optical fibers in series, does not comprise any single-mode optical fiber, is situated in the enclosure, and is disposed between the input terminal and the output terminal. An input mode converter converts the fundamental mode into said higher order mode and is situated between the input terminal and the compensation optical line. An output mode converter converts said higher order mode into the fundamental mode and is situated between the compensation optical line and the output terminal. The module is intended to be connected, by means of the input and output terminals, into a transmission line comprising a single-mode line optical fiber adapted to transmit information in a spectral domain of use. The input terminal and the input mode converter together introduce into the transmission line an input loss $\Gamma_{in}$ expressed in dB. The output terminal and the output mode converter together introduce into the transmission line an output loss $\Gamma_{out}$ expressed in dB. If the compensation line comprises a plurality of compensation optical fibers in series, additional connections between compensation optical fibers together introduce into the transmission line a connection loss $\Gamma_{inter}$ expressed in dB.

The compensation optical fiber, or the set of compensation optical fibers in series, has average parameters at a wavelength of 1550 nm including an average coefficient of attenuation $\alpha_{DCF}$ expressed in dB/km, an average chromatic dispersion $D_{DCF}$ expressed in ps/nm-km and that is negative, an average dispersion slope $S_{DCF}$ expressed in ps/nm$^2$-km and that is negative, an average chromatic dispersion to dispersion slope ratio $D_{DCF}/S_{DCF}$ expressed in nm, an average figure of merit $FOM_{DCF}$ expressed in ps/nm-dB and equal to $-D_{DCF}/\alpha_{DCF}$ (giving a value that is positive since $D_{DCF}$ is itself negative), an average effective area $A_{eff}$ expressed in $\mu m^2$, and an average second order refractive index coefficient as a function of intensity $n_2$ expressed in $10^{-20}$ m$^2$/W. As already explained hereinabove, firstly the average coefficient of attenuation in the case of a single compensation optical fiber is lumped with the corresponding coefficient of attenuation of the single compensation optical fiber, and in the case of a set of compensation optical fibers in series, the average coefficient of attenuation is equal to the sum of the corresponding attenuation coefficients of the various compensation optical fibers weighted by their respective contributions to the total series length of the compensation optical fibers plus the ratio of the connection loss divided by said total length, and secondly each of the other average parameters in the case of a single compensation optical fiber is lumped with the corresponding parameter of the single compensation optical fiber and each of the other average parameters in the case of a set of compensation optical fibers in series is equal to the arithmetic mean of the corresponding parameters of the compensation optical fibers when weighted by the respective lengths of the compensation optical fibers.

The module has insertion losses IL, where $$IL = \frac{D_{DCM}}{D_{DCF}} \cdot \alpha_{DCF} + \Gamma_{in} + \Gamma_{out}$$

and where $D_{DCM}$=−1360 ps/nm for compensating a standard single-mode line optical fiber or $D_{DCM}$=−680 ps/nm for compensating one example of a non-zero dispersion shifted single-mode line optical fiber. A standard segment of single-mode line optical fiber is approximately 80 kilometers (km) long, which gives an approximate cumulative chromatic dispersion of −1360 ps/nm for a standard single-mode line optical fiber or approximately −680 ps/nm for such an example of a non-zero dispersion shifted single-mode line optical fiber. Even for other examples of non-zero dispersion shifted single-mode line optical fiber having a cumulative dispersion slightly different from −680 ps/nm, evaluating the quality criterion with $D_{DCM}$=−680 ps/nm remains entirely valid. Moreover, to evaluate the quality of a module, the insertion losses are not the real insertion losses of the module, which could be relatively low if the module compensates only a portion of the cumulative dispersion, but rather the insertion losses that the module would have if it fully compensated the cumulative dispersion with a length of compensation optical fiber slightly longer than the length required to compensate only part of the cumulative dispersion. Moreover, in the formulae for the quality criterion, and the non-linearity criterion, the cumulative dispersion is chosen to be −1360 ps/nm or −680 ps/nm depending on the type of single-mode line optical fiber to be compensated, but the module can also be used to compensate other values of cumulative dispersion or even to compensate only a portion of the cumulative dispersion. The insertion losses decrease as the figure of merit increases. The insertion losses remain constant for a constant figure of merit.

To be able to compensate to within approximately ±20% the chromatic dispersion to dispersion slope ratio of a standard single-mode line optical fiber, the compensation optical fiber or the set of compensation optical fibers in series has an average chromatic dispersion to dispersion slope ratio in the range 240 nm to 400 nm. To be able to compensate to within approximately ±10% the chromatic dispersion to dispersion slope ratio of a standard single-mode line optical fiber, the compensation optical fiber or the set of compensation optical fibers in series preferably has an average chromatic dispersion to dispersion slope ratio in the range 270 nm to 370 nm.

To be able to compensate the chromatic dispersion to dispersion slope ratio of most non-zero dispersion shifted single-mode line optical fibers, the compensation optical fiber or the set of compensation optical fibers in series preferably has an average chromatic dispersion to dispersion slope ratio less than 200 nm.

The module has a non-linearity criterion (NLC) representing non-linear effects, i.e. the effects of non-linear phase, in the particular case of constant losses between the two amplifiers of the two-stage amplifier system,
where $$NLC = \frac{100 \cdot n_2 \cdot \left(1 - 10^{\frac{D_{DCM}}{10 \cdot FOM_{DCF}}}\right)}{A_{eff} \cdot \alpha_{DCF} \cdot 10^{\frac{\Gamma_{in}}{10}}}.$$

However, although less relevant in other amplification system structures, such as a single-stage amplifier system comprising only one amplifier, the non-linearity criterion would then continue to be of benefit anyway. This non-linearity criterion leads to a seeming paradox, namely that increasing the attenuation of an optical fiber at constant figure of merit reduces the non-linearity criterion and increases the performance of the module. The non-linearity criterion can even be reduced by reducing the figure of merit, provided that the attenuation is increased sufficiently without excessively degrading the effective area and the coefficient $n_2$.

The module has a quality criterion CQ defined as follows: CQ=IL+10 log NLC. The two contributions, namely the insertion losses and the non-linearity criterion, are reduced to the same units and expressed in dB. The quality criterion CQ is representative of the overall quality of a compensation module.

In particular, when integrating the compensation module into a two-stage amplification system, the quality criterion of the invention shows that it is beneficial to degrade slightly the insertion losses if the losses caused by non-linear effects and represented by the non-linearity criterion are improved proportionately more. For example, it is beneficial to increase the insertion losses by 1 dB if this reduces to 2 dB the contribution of the non-linearity criterion to the quality criterion. Since insertion losses between the two amplifiers of the two-stage amplification system are fixed, the only benefit of any reduction of the insertion losses below the fixed threshold is then the resulting reduction of non-linear effects, which can be obtained more easily by a significant reduction in the quality criterion associated with a slight increase in the insertion losses. Indeed, below the fixed threshold, a further reduction of the insertion losses would not lead to any improvement in the overall optical loss budget, as it would be canceled out by a corresponding increase in the attenuation of the attenuator; the only advantage associated with this reduction of the insertion losses is obtained in terms of ability to withstand non-linear effects, which ability can be improved more effectively and more easily by trading a slight increase in the insertion losses against a corresponding greater reduction of the non-linearity criterion.

With a chosen constant figure of merit of the compensation optical fiber, reducing the quality criterion amounts to reducing the non-linearity criterion, as the insertion losses are constant at a constant figure of merit for the compensation optical fiber when the only parameters that vary are the parameters of the compensation optical fiber. Reducing the non-linearity criterion at constant figure of merit amounts to increasing the product of the attenuation multiplied by the effective area and divided by the coefficient $n_2$. Reducing $n_2$ and increasing the effective area seems fairly natural, whereas increasing the attenuation of the compensation optical fiber seems somewhat paradoxical.

FIG. 1 is a diagram showing an example of a transmission line integrating a compensation module of the invention. The transmission line corresponds to a segment which, when periodically repeated and combined with send and receive devices, constitutes the communications system. The transmission line comprises in succession, in the propagation direction of the optical signal, a line optical fiber 1 and an amplification and compensation system 6. The amplification and compensation system 6 comprises in succession: an upstream amplifier 2, an attenuator 3, a compensation module 4 of the invention, and a downstream amplifier 5. Downstream from the downstream amplifier 5 there is the line optical fiber 1 of the next segment. After propagating along the line optical fiber 1, the optical signal is amplified by the upstream amplifier 2, attenuated by the attenuator 3, has its chromatic dispersion compensated by the compensation module 4, and is amplified again by the downstream amplifier 5, before entering the next segment, i.e. the next transmission line. In a different embodiment the attenuator 3 and the amplifier 5 are omitted.

FIG. 2 is a diagram showing an example of a compensation module of the invention. The compensation module 4 comprises an enclosure 49 containing in succession: an input terminal 41, an upstream mode converter 46, a chromatic dispersion compensation optical line 40, a downstream mode converter 47, and an output terminal 42. The compensation optical line 40 can comprise one or more optical fibers in series interconnected by connectors. The upstream mode converter 46 converts most of the light energy propagating in the $LP_{01}$ fundamental mode to a higher-order mode, for example $LP_{02}$. The downstream mode converter 47 converts most of the light energy propagating in the higher-order mode $LP_{02}$ to the fundamental mode $LP_{01}$. In FIG. 2, for example, the compensation optical line 40 comprises two compensation optical fibers 43 and 45 connected together by a connector 44. On the upstream side, at the output of the attenuator 3, the optical signal enters via the input terminal 41, is converted from the fundamental mode to a higher-order mode by the upstream converter 46, propagates in the compensation optical fiber 43, passes through the connector 44, propagates in the compensation optical fiber 45, is converted from said higher-order mode to the fundamental mode, and then exits via the downstream output terminal 42, i.e. at the input of the downstream amplifier 5.

FIG. 3 is a table comparing the relative performance of prior art compensation modules and examples of compensation modules in accordance with the invention in the case of compensating a standard single-mode line optical fiber. The first column gives the numbers of the compensation module examples. The prior art compensation module examples are numbered B1, B2, B3. Examples B1, B2, B3 correspond to modules combining in series two compensation optical fibers, one of which is an HOM multimode fiber and the other of which is a single-mode fiber, all the optical fiber characteristics set out in the table corresponding to the characteristics of the HOM multimode compensation optical fiber. The examples of compensation modules of the invention are numbered A1, A2, A3, A4. The next column gives the negative of the cumulative chromatic dispersion of the line optical fiber, which is the negative of the chromatic dispersion that would have to be compensated to compensate fully 80 km of the line optical fiber; it is denoted $D_{DCM}$ and is expressed in ps/nm. The next column gives the chromatic dispersion of the compensation optical fiber, which is denoted $D_{DCF}$ and is expressed in ps/nm-km. The next column gives the dispersion slope of the compensation optical fiber, which is denoted $S_{DCF}$ and is expressed in ps/nm²-km. The next column gives the average chromatic dispersion to dispersion slope ratio of the compensation optical fiber, which is denoted $D_{DCF}/S_{DCF}$ and is expressed in nm. The next column gives the coefficient of attenuation of the compensation optical fiber, which is denoted $\alpha_{DCF}$ and is expressed in dB/km. The next column gives the figure of merit of the compensation optical fiber, which is denoted $FOM_{DCF}$ and is expressed in ps/nm-dB. The next three columns respectively give the input loss at the input terminal of the compensation module, the connection loss if any at the junction between the HOM multimode compensation optical fiber and the single-mode compensation optical fiber (for prior art modules of the second kind in which the output converter is in fact situated between the two compensation optical fibers), and the output loss at the output terminal of the compensation module, which are respectively denoted $\Gamma_{in}$, $\Gamma_{inter}$ and $\Gamma_{out}$, and which are expressed in dB. The next column gives the insertion losses of the compensation module, which are denoted IL and are expressed in dB. The next column gives the effective area of the compensation optical fiber, which is denoted $A_{eff}$ and is expressed in $\mu m^2$. The next column gives the average second order coefficient of the refractive index of the compensation optical fiber as a function of the intensity of the optical signal that propagates therein, which is denoted $n_2$ and is expressed in $10^{-20}$ m²/W. The next column gives the non-linearity criterion of the compensation module, which is denoted NLC and is expressed in $10^{-6}$ km/W-dB. The next column gives the quality criterion of the compensation module, which is denoted CQ and is expressed in dB.

Compensation modules in accordance with the first aspect of the invention do not use single-mode compensation optical fiber in the compensation module and either have a quality criterion that is lower, and therefore better, than the prior art modules or else, for an equivalent quality criterion, they use optical fibers that have a figure of merit that is much lower and which are therefore much less costly to produce.

The example A1 is excluded from the first aspect of the invention because the quality criterion is too high and therefore too poor.

Compensation modules of the invention preferably have a very good quality criterion; to this end, the compensation optical fiber or the set of compensation optical fibers in series has an average chromatic dispersion that is sufficiently negative for the quality criterion to be less than 9 dB.

Compensation modules of the invention preferably have an excellent quality criterion; to this end, the compensation optical fiber or the set of compensation optical fibers in series has an average chromatic dispersion that is sufficiently negative for the quality criterion to be less than 8.5 dB.

The insertion losses are preferably less than 5 dB, which is highly beneficial in the particular case of an amplification and compensation system using only one amplifier.

To facilitate improving the quality criterion, at least one of the compensation optical fibers in the compensation optical line preferably has a core having at least four core segments, to which core cladding is added.

To be able to improve the quality criterion whilst achieving good linearity as a function of wavelength of the average chromatic dispersion to dispersion slope ratio, at least one of the compensation optical fibers in the compensation optical line has a core having at least five core segments, to which core cladding is added.

FIG. 4 is a table comparing the relative performance of prior art compensation modules and examples of compensation modules in accordance with the invention in the case of compensating a non-zero dispersion shifted single-mode line optical fiber. The first column gives the numbers of the compensation module examples. The prior art compensation module examples are numbered B1, B2, C1, C2, C3. The examples of compensation modules in accordance with the invention are numbered A5, A6, A7. Examples B1 and B2 correspond to modules combining in series two compensation optical fibers, one of which is an HOM multimode fiber and the other of which is a single-mode fiber, all the optical fiber characteristics set out in the table corresponding to the characteristics of the HOM multimode compensation optical fiber. The next column gives the negative of the cumulative chromatic dispersion of the line optical fiber, which is the negative of the chromatic dispersion that would have to be compensated in order to fully compensate 80 km of the line optical fiber; it is denoted $D_{DCM}$ and is expressed in ps/nm. The cumulative chromatic dispersion of a non-zero dispersion shifted single-mode line optical fiber is lower than the cumulative chromatic dispersion of a standard single-mode line optical fiber because its chromatic dispersion is lower. The next column gives the chromatic dispersion of the compensation optical fiber, which is denoted $D_{DCF}$ and expressed in ps/nm-km. The next column gives the dispersion slope of the compensation optical fiber, which is denoted $S_{DCF}$ and is expressed in ps/nm²-km. The next column gives the average chromatic dispersion to dispersion slope ratio of the compensation optical fiber, which is denoted $D_{DCF}/S_{DCF}$ and is expressed in nm. The next column gives the coefficient of attenuation of the compensation optical fiber, which is denoted $\alpha_{DCF}$ and is expressed in dB/km. The next column gives the figure of merit of the compensation optical fiber, which is denoted $FOM_{DCF}$ and is expressed in ps/nm-dB. The next three columns respectively give the input loss at the input terminal of the compensation module, the connection loss if any at the junction between the HOM multimode compensation optical fiber and the single-mode compensation optical fiber (for prior art modules of the second type in which the output converter is in fact situated between the two compensation optical fibers), and the output loss at the output terminal of the compensation module, which are respectively denoted $\Gamma_{in}$, $\Gamma_{inter}$ and $\Gamma_{out}$ and which are expressed in dB. The next column gives the insertion losses of the compensation module, which are denoted IL and are expressed in dB. The next column gives the effective area of the compensation optical fiber, which is denoted $A_{eff}$ and is expressed in $\mu m^2$. The next column gives the average second order coefficient of the refractive index of the compensation optical fiber as a function of the intensity of the optical signal that propagates in the fiber, which is denoted $n_2$ and is expressed in $10^{-20}$ m²/W. The next column gives the non-linearity criterion of the compensation module, which is denoted NLC and is expressed in $10^{-6}$ km/W-dB. The next column gives the quality criterion of the compensation module, which is denoted CQ and is expressed in dB.

Compensation modules of the invention have a quality criterion which is much lower than and therefore much better than the prior art modules: there is a difference of approximately 1 dB between the worst compensation module obtained by the method of the invention and the best compensation module obtained in the prior art. An improvement of 1 dB is already considerable.

The invention preferably relates to compensation modules having a very good quality criterion; to this end, the compensation optical fiber or the set of compensation optical fibers in series has average chromatic dispersion that is sufficiently negative for the quality criterion to be less than 5 dB.

The invention preferably relates to compensation modules having an excellent quality criterion; to this end, the compensation optical fiber or the set of compensation optical fibers in series has average chromatic dispersion that is sufficiently negative for the quality criterion to be less than 4.5 dB.

The insertion losses are preferably less than 4 dB, which is highly beneficial in the particular case of an amplification and compensation system using only one amplifier.

To be able to improve the quality criterion whilst achieving good linearity as a function of wavelength of the average chromatic dispersion to dispersion slope ratio, at least one of the compensation optical fibers in the compensation optical line has a core having at least four core segments, to which core cladding is added.

This is a difference compared to a compensation module for a standard single-mode line optical fiber, which necessitates at least five core segments under the same conditions, as the chromatic dispersion to dispersion slope ratio of a standard single-mode line optical fiber is generally higher than that of a non-zero dispersion shifted line optical fiber.

To be able to improve the quality criterion whilst achieving good linearity as a function of wavelength of the average chromatic dispersion to dispersion slope ratio when said ratio is very high, that is to say greater than 200 nm, at least one of the compensation optical fibers in the compensation optical line has a core having at least five core segments, to which core cladding is added.

FIG. 5 is a diagram showing a family of curves plotting the variation in the quality criterion as a function of the figure of merit of the compensation optical fiber at a chosen constant chromatic dispersion for the compensation optical fiber and in the case of compensating a standard single-mode line optical fiber. The general trends of the curves shown in FIG. 5 apply equally to compensating a non-zero dispersion shifted line optical fiber. The quality criterion CQ expressed in dB is plotted up the ordinate axis. The figure of merit $FOM_{DCF}$ expressed in ps/nm-dB is plotted along the abscissa axis. The curve CA corresponds to a chromatic dispersion of −300 ps/nm-km. The curve CB corresponds to a chromatic dispersion of −350 ps/nm-km. The curve CC corresponds to a chromatic dispersion of −400 ps/nm-km. By their relatively shallow slope and their relatively wide spacing, the curves CA, CB, CC show that in order to reduce the quality criterion, and thus improve it, it is more effective to reduce the chromatic dispersion of the compensation optical fiber at constant figure of merit than to increase the figure of merit of the compensation optical fiber at constant chromatic dispersion. This is all the more true if the figure of merit is high and in particular greater than a value of approximately 300 ps/nm-dB.

To obtain a simpler compensation module, the compensation optical line preferably comprises a single optical fiber connecting the input terminal to the output terminal. A plurality of compensation optical fibers in series provides better compensation of the dispersion slope of the line optical fiber, at the cost of some complexity.

The signal amplification and chromatic dispersion compensation system preferably comprises in succession a first signal amplifier, a signal attenuator, a chromatic dispersion compensation module of the invention, and a second signal amplifier.

In another preferred embodiment, the signal amplification and chromatic dispersion compensation system comprises a single signal amplifier followed by a chromatic dispersion compensation module of the invention.

Because of the very good quality criteria of compensation modules of the invention, which are better than those of the prior art, and much better than those of compensation modules based only on single-mode compensation optical fibers, it is possible to use a compensation module with only one amplifier.

The transmission line preferably comprises in succession a single-mode line optical fiber for transmitting information in a spectral range of use and a signal amplification and chromatic dispersion compensation system of the invention.

FIG. 6 is a table of absolute maximum index difference and radius values for a few examples of profiles of HOM multimode compensation optical fibers used in a compensation module of the invention. The left-hand column identifies the profiles A1 to A7. The numbers A1 to A7 are the same as in FIGS. 3 and 4: two numbers that are the same correspond to the same compensation optical fiber. The second column indicates the number of core segments in the core index profile of the example concerned. The next six columns give the radii in $\mu$m of the varying core index profile. The last six columns give one thousand times the index difference relative to the constant index of the cladding (no units). Not all the boxes of the table are filled in, as not all the profiles have the same number of core segments. Negative index differences indicate buried core segments.

FIG. 7 is a table of other properties of profiles of the HOM multimode compensation optical fibers shown in FIG. 6. The boxes of this table that contain no figure but only a dash correspond to properties that are so bad that they render the optical fiber unusable at the wavelength concerned or in the operating spectral range concerned. The left-hand column identifies the profiles, as already explained hereinabove. The next column gives the number of core segments in each profile. For each profile, the other columns give properties of the optical fiber corresponding to the profile concerned. The next column gives the effective area $A_{eff}$ expressed in $\mu$m$^2$ at a wavelength of 1550 nm. The next column gives the chromatic dispersion expressed in ps/nm-km at a wavelength of 1550 nm. The next seven columns give the dispersion slopes expressed in ps/nm$^2$-km at the wavelengths of 1530 nm, 1550 nm, 1565 nm, 1570 nm, 1580 nm, 1590 nm, 1605 nm, respectively. The next column gives the minimum chromatic dispersion wavelength expressed in nm. The last three columns give the maximum relative slope variations expressed as a percentage for respective operating spectral ranges in the range 1530 nm to 1565 nm, in the range 1530 nm to 1580 nm, and in the range 1530 nm to 1605 nm. The relative variation in the dispersion slope over an operating spectral range corresponds to the quotient obtained by dividing the difference between the maximum dispersion slope over said operating spectral range and the minimum dispersion slope over said operating spectral range by the average dispersion slope over said operating spectral range. The poor results in the last column correspond to maximum relative variations of slope that are much higher than those in the other columns, and can be explained in particular by minimum chromatic dispersion wavelengths that are too close to the upper limit of the operating spectral range concerned.

Examples A2 and A6 are excluded from the second aspect of the invention because the linearity of the dispersion slope as a function of wavelength is relatively poor, as is the linearity of the chromatic dispersion to dispersion slope ratio. These examples have only three core segments.

Example A1 is excluded from the second aspect of the invention because the negative chromatic dispersion is not sufficiently negative. This example has only four core segments.

With fewer than five core segments, it in fact seems impossible to reconcile a very highly negative chromatic dispersion with a very high chromatic dispersion to dispersion slope ratio with very good linearity as a function of wavelength.

With fewer than four core segments, it in fact seems impossible to reconcile a very highly negative chromatic dispersion with a high chromatic dispersion to dispersion slope ratio having very good linearity as a function of wavelength.

FIG. 8 is a diagram showing an example of a core profile with four core segments of an HOM multimode compensation optical fiber used in a compensation module of the invention. The radii expressed in μm are plotted along the abscissa axis. One thousand times the index differences is plotted up the ordinate axis (no units). The first core segment, also known as the central core segment, has a maximum index difference $\Delta n1$ with respect to the constant index of the cladding and an outside radius r1. The maximum index difference $\Delta n1$ is positive. The index is preferably constant between a zero radius and the radius r1. The second core segment, also known as the first peripheral core segment, has an absolute maximum index difference value $\Delta n2$ with respective to the constant index of the cladding and an outside radius r2. The absolute maximum index difference value $\Delta n2$ can be positive or negative. The index is preferably constant between the radius r1 and the radius r2. The third core segment, also known as the second peripheral core segment, has an absolute maximum index difference value $\Delta n3$ with respect to the constant index of the cladding and an outside radius r3. The absolute maximum index difference value $\Delta n3$ can be positive or negative. The index is preferably constant between the radius r2 and the radius r3. The fourth core segment, also known as the third peripheral core segment, has an absolute maximum index difference value $\Delta n4$ with respect to the constant index of the cladding and an outside radius r4. The absolute maximum index difference value $\Delta n4$ can be positive or negative. The index is preferably constant between the radius r3 and the radius r4. Beyond the radius r4 is the constant index cladding.

FIG. 9 shows diagrammatically one example of a core profile with five core segments of an HOM multimode compensation optical fiber used in a compensation module of the invention. The radii expressed in μm are plotted along the abscissa axis. One thousand times the index differences is plotted up the ordinate axis (no units). The first core segment, also known as the central core segment, has an absolute maximum index difference value $\Delta n1$ with respect to the constant index of the cladding and an outside radius r1. The maximum index difference $\Delta n1$ is positive. The index is preferably constant between a zero radius and the radius r1. The second core segment, also known as the first peripheral core segment, has an absolute maximum index difference value $\Delta n2$ with respective to the constant index of the cladding and an outside radius r2. The absolute maximum index difference value $\Delta n2$ can be positive or negative. The index is preferably constant between the radius r1 and the radius r2. The third core segment, also known as the second peripheral core segment, has an absolute maximum index difference value $\Delta n3$ with respect to the constant index of the cladding and an outside radius r3. The absolute maximum index difference value $\Delta n3$ can be positive or negative. The index is preferably constant between the radius r2 and the radius r3. The fourth core segment, also known as the third peripheral core segment, has an absolute maximum index difference value $\Delta n4$ with respect to the constant index of the cladding and an outside radius r4. The absolute maximum index difference value $\Delta n4$ can be positive or negative. The index is preferably constant between the radius r3 and the radius r4. The fifth core segment, also known as the fourth peripheral core segment, has an absolute maximum index difference value $\Delta n5$ with respect to the constant index of the cladding and an outside radius r5. The absolute maximum index difference value $\Delta n5$ can be positive or negative. The index is preferably constant between the radius r4 and the radius r5. Beyond the radius r5 is the constant index cladding.

What is claimed is:

1. A chromatic dispersion compensation module comprising, an enclosure (49) including an input terminal (41) and an output terminal (42), a higher-order mode chromatic dispersion compensation optical line (40) situated inside the enclosure and disposed between the input terminal and the output terminal, the line comprising one or more HOM multimode chromatic dispersion compensation optical fibers (43, 45) in series and not comprising any single-mode optical fiber, an input mode converter (46) for converting the fundamental mode into said higher order mode, situated between the input terminal and the compensation optical line, an output mode converter (47) for converting said higher order mode into the fundamental mode, situated between the compensation optical line and the output terminal, the module being adapted to be inserted by means of the input and output terminals into a transmission line comprising a standard single-mode line optical fiber adapted to transmit information in a spectral domain of use, the input terminal and the input mode converter together introducing into the transmission line an input loss $\Gamma_{in}$ expressed in dB, the output terminal and the output mode converter together introducing into the transmission line an output loss $\Gamma_{out}$ expressed in dB, additional connections, if any, between compensation optical fibers together introducing into the transmission line a connection loss $\Gamma_{inter}$ expressed in dB, the compensation optical fiber or the set of compensation optical fibers in series presenting, at a wavelength of 1550 nm, a plurality of average parameters including an average coefficient of attenuation $\alpha_{DCF}$ expressed in dB/km, an average chromatic dispersion $D_{DCF}$ expressed in ps/nm-km and that is negative, an average dispersion slope $S_{DCF}$ expressed in ps/nm²-km and that is negative, an average chromatic dispersion to dispersion slope ratio $D_{DCF}/S_{DCF}$ expressed in nm, an average figure of merit $FOM_{DCF}$ defined as $-D_{DCF}/\alpha_{DCF}$ expressed in ps/nm-dB, an average effective area $A_{eff}$ expressed in $\mu m^2$, and an average second order coefficient $n_2$ of the refractive index as a function of the intensity expressed in $10^{-20}$ m²/W, the average chromatic dispersion to dispersion slope ratio being the ratio between the average chromatic dispersion and the average dispersion slope, the average figure of merit being the negative of the ratio between the average chromatic dispersion and the average coefficient of attenuation, the average coefficient of attenuation in the case of a single compensation optical fiber being lumped with the corresponding coefficient of attenuation of said single compensation optical fiber and in the case of a set of compensation optical fibers in series, the average coefficient of attenuation is equal to the sum of the corresponding attenuation coefficients of the various compensation optical fibers weighted by their respective contributions to the total series length of the compensation optical fibers plus the ratio of the connection loss divided by said total length, each of said other average parameters in the case of a single compensation optical fiber being lumped with the corresponding parameter of said single compensation optical fiber and each of said other average parameters in the case of a set of compensation optical fibers in series being the arithmetic mean of the corresponding parameters of the various compensation optical fibers when weighted by the respective lengths of said various compensation optical fibers, the module having insertion losses IL expressed in dB, where $$IL = \frac{D_{DCM}}{D_{DCF}} \cdot \alpha_{DCF} + \Gamma_{in} + \Gamma_{out}$$

and where $D_{DCM} = -1360$ ps/nm, the module having a non-linearity criterion NLC representing the effects of the non-linear phase and expressed in $10^{-6}$ km/W-dB, where $$NLC = \frac{100 \cdot n_2 \cdot \left(1 - 10^{\frac{D_{DCM}}{10 \cdot FOM_{DCF}}}\right)}{A_{eff} \cdot \alpha_{DCF} \cdot 10^{\frac{\Gamma_{in}}{10}}},$$

the module presenting a quality criterion CQ expressed in dB, where $CQ = IL + 10 \log NLC$, and the compensation optical fiber or the set of compensation optical fibers in series having, firstly, an average chromatic dispersion more negative than $-200$ ps/nm-km, secondly, an average chromatic dispersion to dispersion slope ratio in the range 240 nm to 400 nm, and thirdly, an average chromatic dispersion sufficiently negative for the quality criterion to be less than 9.5 dB.

2. A module according to claim 1, characterized in that the compensation optical fiber or the set of compensation optical fibers in series has average chromatic dispersion sufficiently negative for the quality criterion to be less than 9 dB.

3. A module according to claim 1, characterized in that the compensation optical fiber or the set of compensation optical fibers in series has average chromatic dispersion sufficiently negative for the quality criterion to be less than 8.5 dB.

4. A module according to claim 1, characterized in that the insertion losses are less than 5 dB.

5. A module according to claim 1, characterized in that at least one of the compensation optical fibers of the compensation optical line has a core with at least four core segments, to which core cladding is added.

6. A module according to claim 1, characterized in that at least one of the compensation optical fibers of the compensation optical line has a core with at least five core segments, to which core cladding is added.

7. A module according to either claim 1 or claim 5, characterized in that the compensation optical fiber or the set of compensation optical fibers in series has an average chromatic dispersion to dispersion slope ratio in the range 270 nm to 370 nm.

8. A chromatic dispersion compensation module comprising, an enclosure (49) including an input terminal (41) and an output terminal (42), a higher-order mode chromatic dispersion compensation optical line (40) situated inside the enclosure and disposed between the input terminal and the output terminal, the line comprising one or more HOM multimode chromatic dispersion compensation optical fibers (43, 45) in series and not comprising any single-mode optical fiber, an input mode converter (46) for converting the fundamental mode into said higher order mode, situated between the input terminal and the compensation optical line, an output mode converter (47) for converting said higher order mode into the fundamental mode, situated between the compensation optical line and the output terminal, the module being adapted to be inserted by means of the input and output terminals into a transmission line comprising a standard single-mode line optical fiber adapted to transmit information in a spectral domain of use, and the compensation optical fiber or at least one of the compensation optical fibers in series having a core having at least five core segments, to which core cladding is added, so that said optical fiber having a core with at least five core segments simultaneously has, at a wavelength of 1550 nm, chromatic dispersion more negative than $-300$ ps/nm-km and a chromatic dispersion to dispersion slope ratio greater than 200 nm.

9. A chromatic dispersion compensation module comprising, an enclosure (49) including an input terminal (41) and an output terminal (42), a higher-order mode chromatic dispersion compensation optical line (40) situated inside the enclosure and disposed between the input terminal and the output terminal, the line comprising one or more HOM multimode chromatic dispersion compensation optical fibers (43, 45) in series and not comprising any single-mode optical fiber, an input mode converter (46) for converting the fundamental mode into said higher order mode, situated between the input terminal and the compensation optical line, an output mode converter (47) for converting said higher order mode into the fundamental mode, situated between the compensation optical line and the output terminal, the module being adapted to be inserted by means of the input and output terminals into a transmission line comprising a single-mode non-zero (at 1550 nm) dispersion shifted line optical fiber adapted to transmit information in a spectral domain of use, the input terminal and the input mode converter together introducing into the transmission line an input loss $\Gamma_{in}$ expressed in dB, the output terminal and the output mode converter together introducing into the transmission line an output loss $\Gamma_{out}$ expressed in dB, additional connections, if any, between compensation optical fibers together introducing into the transmission line a connection loss $\Gamma_{inter}$ expressed in dB, the compensation optical fiber or the set of compensation optical fibers in series presenting, at a wavelength of 1550 nm, a plurality of average parameters including an average coefficient of attenuation $\alpha_{DCF}$ expressed in dB/km, an average chromatic dispersion $D_{DCF}$ expressed in ps/nm-km and that is negative, an average dispersion slope $S_{DCF}$ expressed in ps/nm²-km and that is negative, an average chromatic dispersion to dispersion slope ratio $D_{DCF}/S_{DCF}$ expressed in nm, an average figure of merit $FOM_{DCF}$ defined as $-D_{DCF}/\alpha_{DCF}$ expressed in ps/nm-dB, an average effective area $A_{eff}$ expressed in $\mu m^2$, and an average second order coefficient $n_2$ of the refractive index as a function of the intensity expressed in $10^{-20}$ m²/W, the average chromatic dispersion to dispersion slope ratio being the ratio between the average chromatic dispersion and the average dispersion slope, the average figure of merit being the negative of the ratio between the average chromatic dispersion and the average coefficient of attenuation, the average coefficient of attenuation in the case of a single compensation optical fiber being lumped with the corresponding coefficient of attenuation of said single compensation optical fiber and in the case of a set of compensation optical fibers in series, the average coefficient of attenuation is equal to the sum of the corresponding attenuation coefficients of the various compensation optical fibers weighted by their respective contributions to the total series length of the compensation optical fibers plus the ratio of the connection loss divided by said total length, each of said other average parameters in the case of a single compensation optical fiber being lumped with the corresponding parameter of said single compensation optical fiber and each of said other average parameters in the case of a set of compensation optical fibers in series being the arithmetic mean of the corresponding parameters of the various compensation optical fibers when weighted by the respective lengths of said various compensation optical fibers, the module having insertion losses IL expressed in dB, where $$IL = \frac{D_{DCM}}{D_{DCF}} \cdot \alpha_{DCF} + \Gamma_{in} + \Gamma_{out}$$

and where $D_{DCM} = -680$ ps/nm, the module having a non-linearity criterion NLC representing the effects of the non-linear phase and expressed in $10^{-6}$ km/W-dB, where $$NLC = \frac{100 \cdot n_2 \cdot \left(1 - 10^{\frac{D_{DCM}}{10 \cdot FOM_{DCF}}}\right)}{A_{eff} \cdot \alpha_{DCF} \cdot 10^{\frac{\Gamma_{in}}{10}}},$$

the module having a quality criterion CQ expressed in dB, where CQ=IL+10 log NLC, and the compensation optical fiber or the set of compensation optical fibers in series presenting, firstly, an average chromatic dispersion more negative than −250 ps/nm-km, secondly, an average chromatic dispersion sufficiently negative for the quality criterion to be less than 5 dB.

10. A module according to claim 9, characterized in that the compensation optical fiber or the set of compensation optical fibers in series has average chromatic dispersion sufficiently negative for the quality criterion to be less than 5 dB.

11. A module according to claim 10, characterized in that the compensation optical fiber or the set of compensation optical fibers in series has average chromatic dispersion sufficiently negative for the quality criterion to be less than 4.5 dB.

12. A module according to claim 11, characterized in that the insertion losses are less than 4 dB.

13. A module according to claim 9, characterized in that at least one of the compensation optical fibers of the compensation optical line has a core with at least four core segments, to which core cladding is added.

14. A module according to claim 13, characterized in that at least one of the compensation optical fibers of the compensation optical line has a core with at least five core segments, to which core cladding is added.

15. A module according to either claim 9 or claim 13, characterized in that the compensation optical fiber or the set of compensation optical fibers in series has an average chromatic dispersion to dispersion slope ratio less than 200 nm.

16. A chromatic dispersion compensation module comprising, an enclosure (49) including an input terminal (41) and an output terminal (42), a higher-order mode chromatic dispersion compensation optical line (40) situated inside the enclosure and disposed between the input terminal and the output terminal, the line comprising one or more HOM multimode chromatic dispersion compensation optical fibers (43, 45) in series and not comprising any single-mode optical fiber, an input mode converter (46) for converting the fundamental mode into said higher order mode, situated between the input terminal and the compensation optical line, an output mode converter (47) for converting said higher order mode into the fundamental mode, situated between the compensation optical line and the output terminal, the module being adapted to be inserted by means of the input and output terminals into a transmission line comprising a single-mode non-zero (at 1550 nm) dispersion shifted line optical fiber adapted to transmit information in a spectral domain of use, and the compensation optical fiber or at least one of the compensation optical fibers in series having a core having at least four core segments, to which core cladding is added, so that said optical fiber having a core with at least four core segments simultaneously has, at a wavelength of 1550 nm, chromatic dispersion more negative than −300 ps/nm-km and a chromatic dispersion to dispersion slope ratio greater than 80 nm.

17. A module according to claim 1, characterized in that the compensation optical line consists of a single optical fiber connecting the input mode converter to the output mode converter.

18. A module according to claim 1, characterized in that the compensation optical line comprises a plurality of optical fibers of the same family, that is to say either a plurality of segments of the same optical fiber or a plurality of optical fibers that are similar within their fabrication tolerances.

19. A module according to claim 1, characterized in that the compensation optical line comprises a plurality of separate optical fibers and in that the spectral domain of use comprises at least two of spectral bands S, C and L.

20. A signal amplification and chromatic dispersion compensation system comprising in succession a first signal amplifier (2), a signal attenuator (3), a chromatic dispersion compensation module (4) according to claim 1, and a second signal amplifier (5).

21. A signal amplification and chromatic dispersion compensation system comprising a single signal amplifier (2) followed by a chromatic dispersion compensation module (4) according to claim 1.

22. A transmission line comprising in succession a single-mode line optical fiber (1) adapted to transmit information in a spectral domain of use and a signal amplification and chromatic dispersion compensation system (6) according to claim 20 or claim 21.

23. A method of designing a chromatic dispersion compensation module, said module being adapted to comprise, an enclosure including an input terminal and an output terminal, a higher-order mode chromatic dispersion compensation optical line situated inside the enclosure and disposed between the input terminal and the output terminal, the line comprising one or more HOM multimode chromatic dispersion compensation optical fibers in series and not comprising any single-mode optical fiber, an input mode converter for converting the fundamental mode into said higher order mode, situated between the input terminal and the compensation optical line, an output mode converter for converting said higher order mode into the fundamental mode, situated between the compensation optical line and the output terminal, said module being adapted to be inserted by means of the input and output terminals into a transmission line comprising a single-mode line optical fiber adapted to transmit information in a spectral domain of use, the input terminal and the input mode converter together introducing into the transmission line an input loss $\Gamma_{in}$ expressed in dB, the output terminal and the output mode converter together introducing into the transmission line an output loss $\Gamma_{out}$ expressed in dB, additional connections, if any, between compensation optical fibers together introducing into the transmission line a connection loss $\Gamma_{inter}$ expressed in dB, the compensation optical fiber or the set of compensation optical fibers in series presenting, at a wavelength of 1550 nm, a plurality of average parameters including an average coefficient of attenuation $\alpha_{DCF}$ expressed in dB/km, an average chromatic dispersion $D_{DCF}$ expressed in ps/nm-km and that is negative, an average dispersion slope $S_{DCF}$ expressed in ps/nm²-km and that is negative, an average chromatic dispersion to dispersion slope ratio $D_{DCF}/S_{DCF}$ expressed in nm, an average figure of merit $FOM_{DCF}$ defined as $-D_{DCF}/\alpha_{DCF}$ expressed in ps/nm-dB, an average effective area $A_{eff}$ expressed in $\mu m^2$, and an average second order coefficient $n_2$ of the refractive index as a function of the intensity expressed in $10^{-20}$ m²/W, the average chromatic dispersion to dispersion slope ratio being the ratio between the average chromatic dispersion and the average dispersion slope, the average figure of merit being the negative of the ratio between the average chromatic dispersion and the average coefficient of attenuation, the average coefficient of attenuation in the case of a single compensation optical fiber being lumped with the corresponding coefficient of attenuation of said single compensation optical fiber and in the case of a set of compensation optical fibers in series, the average coefficient of attenuation is equal to the sum of the corresponding attenuation coefficients of the various compensation optical fibers weighted by their respective contributions to the total series length of the compensation optical fibers plus the ratio of the connection loss divided by said total length, each of said other average parameters in the case of a single compensation optical fiber being lumped with the corresponding parameter of said single compensation optical fiber and each of said other average parameters in the case of a set of compensation optical fibers in series being the arithmetic mean of the corresponding parameters of the various compensation optical fibers when weighted by the respective lengths of said various compensation optical fibers, said module being adapted to present insertion losses IL expressed in dB, where $$IL = \frac{D_{DCM}}{D_{DCF}} \cdot \alpha_{DCF} + \Gamma_{in} + \Gamma_{out}$$

and where $D_{DCM}$ represents the negative of the cumulative dispersion of the line optical fiber, said module being adapted to have a non-linearity criterion NLC representing the effects of the non-linear phase and expressed in $10^{-6}$ km/W-dB, where $$NLC = \frac{100 \cdot n_2 \cdot \left(1 - 10^{\frac{D_{DCM}}{10 \cdot FOM_{DCF}}}\right)}{A_{\mathit{eff}} \cdot \alpha_{DCF} \cdot 10^{\frac{\Gamma_{in}}{10}}},$$

said module being adapted to present a quality criterion CQ expressed in dB, where CQ=IL+10 log NLC, said design method including an optimization step for optimizing said module, said optimization step consisting in reducing the quality criterion.

24. A higher-order mode chromatic dispersion compensation optical fiber having a core having at least four core segments, to which core cladding is added, and simultaneously having, at a wavelength of 1550 nm, chromatic dispersion more negative than −300 ps/nm-km and a chromatic dispersion to dispersion slope ratio greater than 80 nm.

25. A higher-order mode chromatic dispersion compensation optical fiber according to claim 24, wherein said higher-order mode is $LP_{02}$.

26. A higher-order mode chromatic dispersion compensation optical fiber according to claim 24 or 25, wherein said chromatic dispersion to dispersion slope ratio is greater than 120 nm.

27. A higher-order mode chromatic dispersion compensation optical fiber having a core having at least five core segments, to which core cladding is added, and simultaneously having, at a wavelength of 1550 nm, chromatic dispersion more negative than −300 ps/nm-km and a chromatic dispersion to dispersion slope ratio greater than 200 nm.

28. A higher-order mode chromatic dispersion compensation optical fiber according to claim 27, wherein said higher-order mode is $LP_{02}$.

29. A module according to claim 8, characterized in that the compensation optical line consists of a single optical fiber connecting the input mode converter to the output mode converter.

30. A module according to claim 9, characterized in that the compensation optical line consists of a single optical fiber connecting the input mode converter to the output mode converter.

31. A module according to claim 8, characterized in that the compensation optical line comprises a plurality of optical fibers of the same family, that is to say either a plurality of segments of the same optical fiber or a plurality of optical fibers that are similar within their fabrication tolerances.

32. A module according to claim 9, characterized in that the compensation optical line comprises a plurality of optical fibers of the same family, that is to say either a plurality of segments of the same optical fiber or a plurality of optical fibers that are similar within their fabrication tolerances.

33. A module according to claim 8, characterized in that the compensation optical line comprises a plurality of separate optical fibers and in that the spectral domain of use comprises at least two of spectral bands S, C and L.

34. A module according to claim 9, characterized in that the compensation optical line comprises a plurality of separate optical fibers and in that the spectral domain of use comprises at least two of spectral bands S, C and L.

35. A module according to claim 16, characterized in that the compensation optical line comprises a plurality of separate optical fibers and in that the spectral domain of use comprises at least two of spectral bands S, C and L.

* * * * *